Patented Aug. 12, 1930

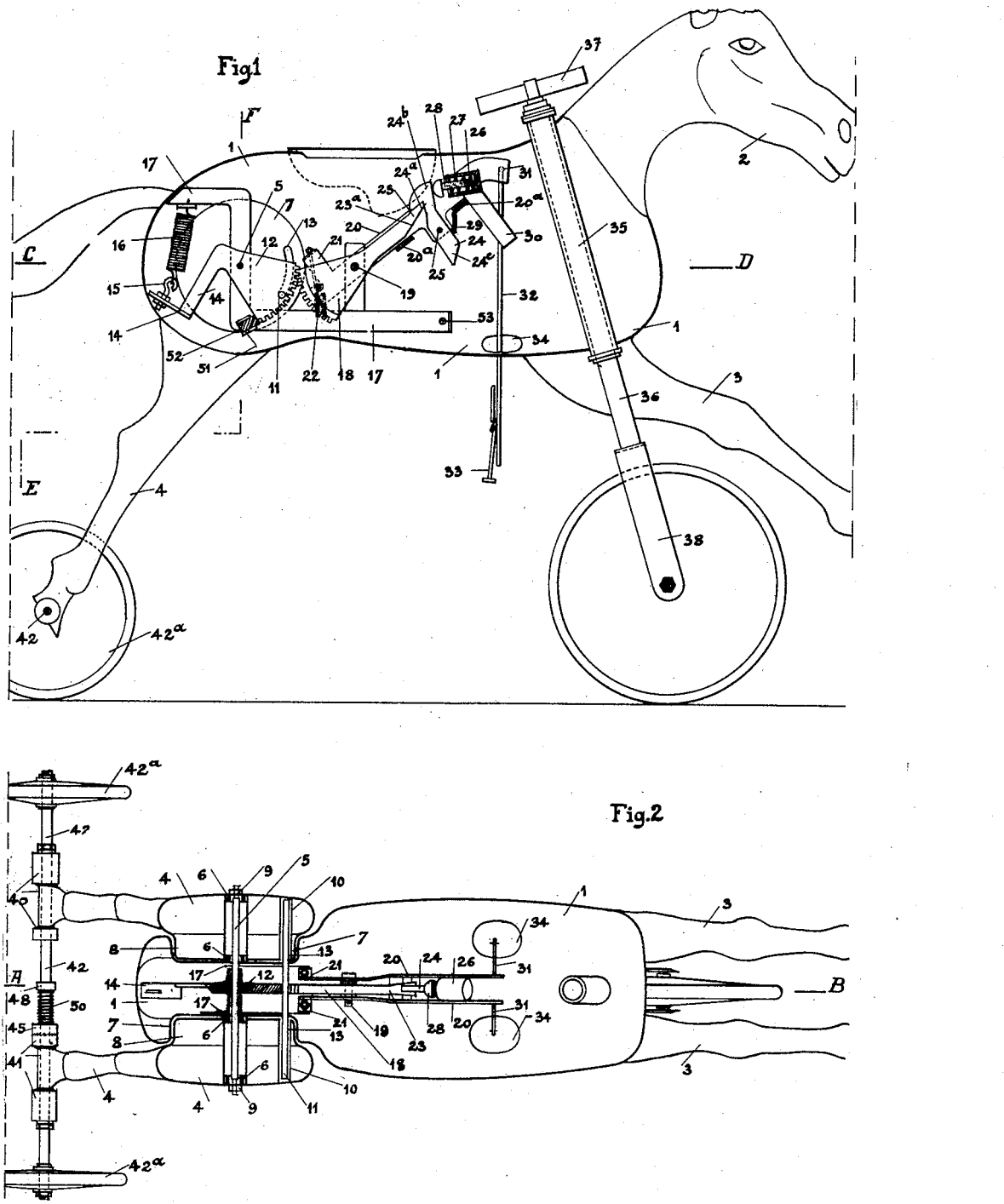

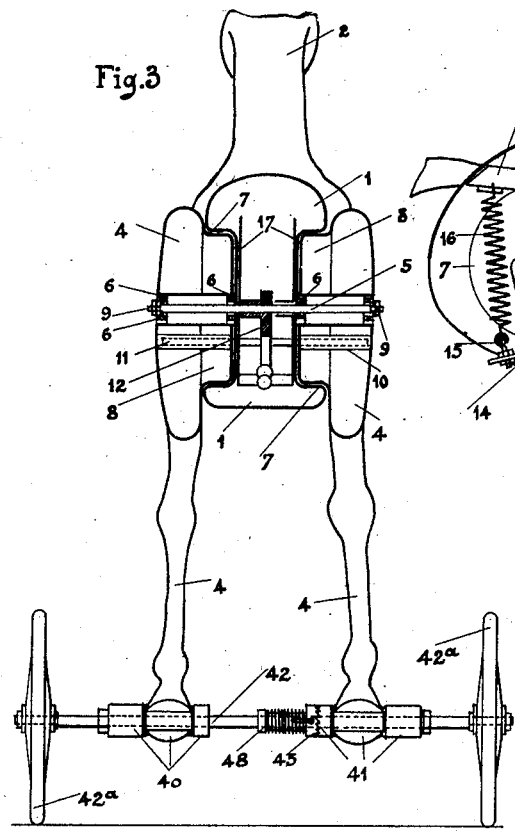

1,773,062

UNITED STATES PATENT OFFICE

HEINRICH ROTHSCHILD, OF NIENBURG-ON-THE-WESER, GERMANY

RUNNING HORSE

Application filed June 8, 1928, Serial No. 283,914, and in Germany September 30, 1927.

This invention relates to improvements in hobby horses, the object of the invention being to provide an improved hobby horse provided with mechanism by which the rear legs may be caused to move idly forwardly and then be caused to move effectively rearwardly to thereby impart forward movement to the horse and also embodying means by which the rider by raising and lowering his feet may control and cause the movement of the horse.

With the above and other objects in view, the invention consists in the construction, combination and arrangement of devices hereinafter described and claimed.

In the accompany drawings

Fig. 1 is a longitudinal section through the body of the horse on line A—B, of Fig. 2.

Fig. 2 is a section on line C—D, of Fig. 1.

Fig. 3 is a section on line E—F, of Fig. 1.

Fig. 4 is a longitudinal section on line A—B of Fig. 2, and

Figs. 5 and 6 show details.

The horse consists of the body 1 with the head 2 and the forelegs 3, which are made of thin sheet material, the hind legs 4, which are similarly of sheet material, are rotatably journalled about the axle 5 on ball bearings 6. Two circular recesses 7 are formed in the body, into which corresponding cylindrical enlargements 8 of the hind legs 4, are inserted. The axle 5 passes through both hind legs 4 and the body 1 and has at its ends nuts 9, which hold the legs and body together.

In the hind legs 4 are secured tubular sleeves 10 in which a bolt 11 is inserted through slots 13 in the walls of the recesses 7 and mounted on a toothed segment 12 which is mounted on the axle 5 and rigidly connected therewith. The toothed segment 12 has an angularly bent arm 14 on which a hook 15 is secured and to which one end of a tension spring 16 is attached. The other end of the tension spring is secured to a flat iron frame 17 which is riveted to the body 1. Said frame is provided at its rear end with a holder 51 for a rubber stop 52. In engagement with the toothed segment 12 is a second toothed segment 18 which is pivotal about the bolt 19 which rests in the frame 17. To both sides of the toothed segment 18 are mounted two bars 20 also rotatably journalled about bolt 19 and each having an angular arm 21 to which tension springs 22 are suspended. The other ends of the springs 22 are secured to the frame 17. The bars 20 are connected together by a crossbar 20ª and together form a rigid body. The toothed segment 18 engages with its extension 23 in a notch 24ª of the pawl 24 which lies between the bars 20 and is rotatable about a pin 25 which connects said bars. The head 24ᵇ of the pawl lying above the notch 24ª is rounded in form, whilst the other end of the pawl tapers to an incline 24ᶜ. Between the bars is secured further a sleeve 26 which serves to take the pressure spring 27 and the pin 28. On the bars 20 is also an abutment 29 for the pawl 24 and an arm 30 which extends downwardly from the front portions of said bars and serves as an abutment therefor by striking the lower side of the body. Hangers 32 which may be straps, rods or the like, depend from the bars 20 and are attached thereto as at 31. Said hangers pass through openings 34 in the lower side of the body and are provided with stirrups 33. The stop 52 of the frame 17 serves as an abutment for the toothed segment 12. The frame also carries a pin 53. In the front of the body portion 1 between the front legs 3 and the neck is welded a tube 35 in which is inserted a second tube 36 terminating at the top in a handle 37 and at the bottom in a fork 38 in which the front wheel 39 rests.

The feet of the two hind legs 4 rest on bushes 40, 41 which sit on the shaft 42 to which the rear wheels 42ª are keyed. The bush 41 has on its end face a crown of inclined teeth 43 which mesh with the teeth 44 of the ring 45 (Figs. 5 and 6). The screw 46 in the ring 45 engages with its end in a slot 47 in the sleeves 48 which is riveted to the shaft by a pin 49. The ring 45 is slidable on the sleeves 48 which also has a pressure spring 50.

The manner of operation is as follows:—

The child, which sits upon the horse, treads on the stirrups 33 hanging from the straps 32. The bars 20 on which the straps hang are thereby drawn down and therewith the pawl 24 lying between said bars, which again takes with it the toothed segment 18. The bars 20 and toothed segment 18 turn about the bolt 19. Toothed segment 18 thereby moves the toothed segment 12 about the axle 5 and the bolt 11 carried by said segment slides upwardly in the slots 13 and since it is inserted in the sleeves 10 takes the hind legs 4 with it. The latter turn with their enlargements 8 in the recesses 7 of the body 1 about the axle 5. The bars 20 and the toothed segment 18 move until the arm 30 serving as an abutment touches the body 1 of the horse (Fig. 4). The tension springs 16, 22 are thereby extended on the downward movement of the bars 20. The incline 24ᵃ of the pawl 24 slides over the pin 33 and acts so that the pawl 24 turns about the pin 25, the extension 23 of the toothed segment 18 is released and the pin 28 presses against the compression spring 27 in the sleeve 26. When the extension 23 is free, the toothed segments 18 and 12 are drawn back into their original position by the tension spring 16. The bolt 11 thereby moves downwardly in the slots 13 and throws the body of the horse forward, since the rear leg wheels 42ᵃ cannot roll back. The stronger the tension spring 16, the greater the speed which the horse makes forward. The toothed segment 12 thereupon moves until it strikes against the rubber stop 52 which serves as an abutment.

The bars 20 are drawn up by the springs 22 when the child draws up its feet. The head 24ᵇ of the pawl 24 thereupon moves beneath the incline 23ᵃ of the extension 23, against the resistance of the pin 28 until the pointed end of the extension 23 engages in the notch 24ᶜ. The two tension springs 22 thus work against the compression spring 27 which presses the pawl against the extension 23.

In Figs. 5 and 6 is shown the device which makes it possible for the hind legs to run only forward and not backwards. The shaft 42, on which the rear wheels 42ᵃ are keyed, rotates forwardly on drawing up the rear legs and takes the sleeve 48 and the ring 45 with them. Hereupon the teeth 44 slide over the teeth 43 of the bush 41 to which the legs are secured and which stands fast. The teeth are so formed that they can only run forwards and not backwards.

The front wheel 39 can be guided by means of the steering device 35—38.

I claim:

1. A hobby horse having a leg arranged for forward and rearward movement, a wheel supporting said leg and provided with means to permit rotation of said wheel in one direction and prevent rotation thereof in the reverse direction, spring actuated means to move said leg in one direction and manually operable means for operation of said spring actuated means.

2. A hobby horse as claimed in claim 1, in which said movable leg is pivotally mounted, said spring actuated means including an oscillatory segment and a spring active when under tension to move said segment in one direction, and said manually operable means including a pivotally mounted segment engaged with the first named segment, a hanger whereby said second named segment may be moved manually in the required direction to cause said second named segment to move the first named segment in the direction required to tension the said spring and also including means to release the second named segment at the end of an effective stroke thereof.

3. A hobby horse as claimed in claim 1, in which said movable leg is pivotally mounted, said spring actuated means including an oscillatory segment and a spring active when under tension to move said segment in one direction, and said manually operable means including a pivotally mounted segment engaged with the first named segment, a hanger whereby said second named segment may be moved manually in the required direction to cause said second named segment to move the first named segment in the direction required to tension the said spring and also including means to release the second named segment at the end of an effective stroke thereof and a spring to restore the last named segment to initial position.

In testimony whereof I have hereunto set my hand this 23rd day of December, A. D. 1927.

HEINRICH ROTHSCHILD.